E. J. BRYAN.
DIRECTION SIGNAL FOR AUTOMOBILES.
APPLICATION FILED DEC. 12, 1914.
1,237,291.
Patented Aug. 21, 1917.
2 SHEETS—SHEET 1.
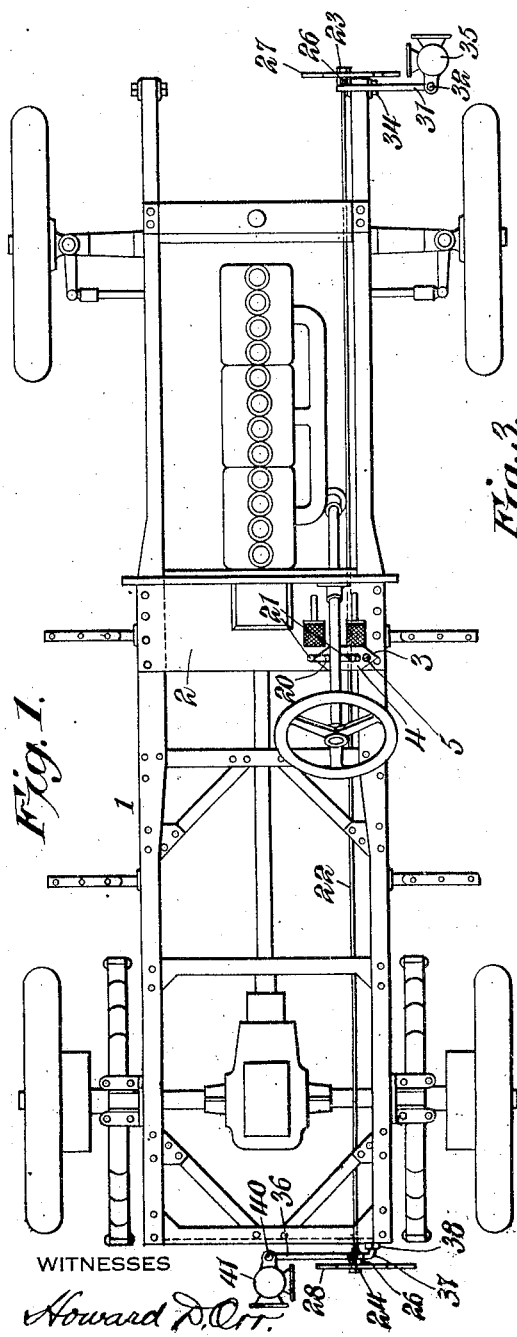
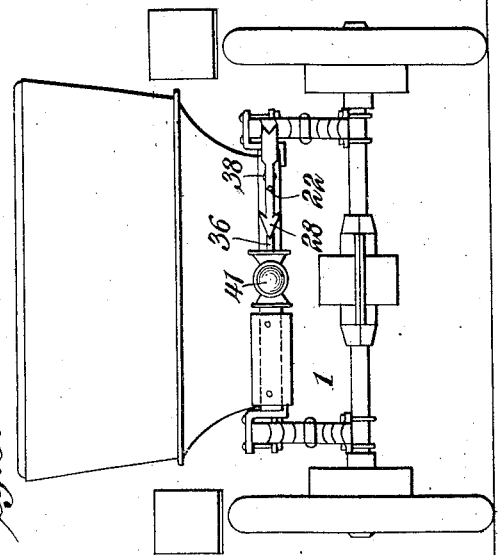
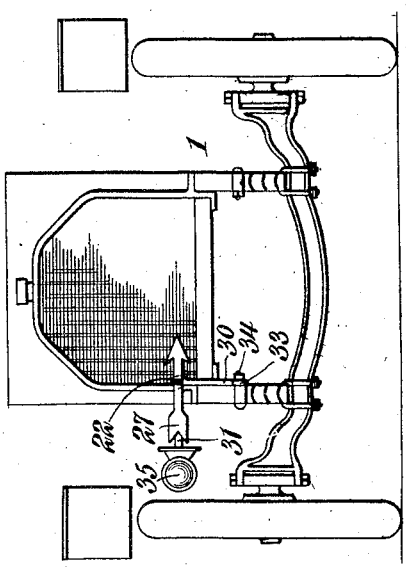
WITNESSES
Howard D. Orr
H. T. Chapman
Edgar J. Bryan, INVENTOR,
BY E. J. Siggers
ATTORNEY

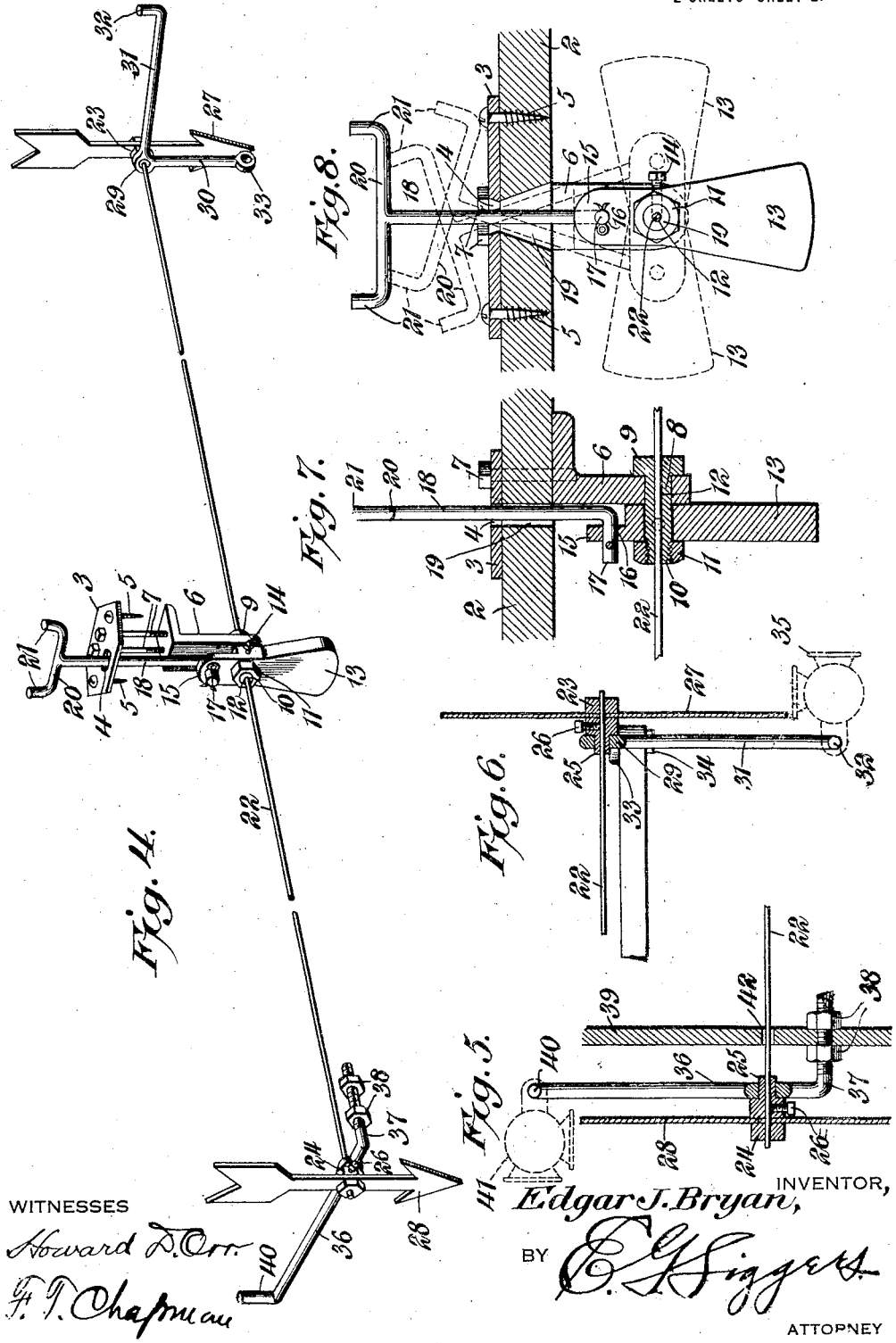

UNITED STATES PATENT OFFICE.

EDGAR J. BRYAN, OF RIVERSIDE, CALIFORNIA, ASSIGNOR OF ONE-HALF TO WILLIAM T. THOMPSON, OF RIVERSIDE, CALIFORNIA.

DIRECTION-SIGNAL FOR AUTOMOBILES.

1,237,291.      Specification of Letters Patent.      Patented Aug. 21, 1917.

Application filed December 12, 1914. Serial No. 876,897.

*To all whom it may concern:*

Be it known that I, EDGAR J. BRYAN, a citizen of the United States, residing at Riverside, in the county of Riverside and State of California, have invented a new and useful Direction-Signal for Automobiles, of which the following is a specification.

This invention has reference to direction signals for automobiles and other vehicles, and its object is to provide an efficient and easily installed device for the purpose which at the same time possesses the advantages of extreme simplicity and low cost of manufacture.

In accordance with the present invention direction indicating devices preferably in the form of arrows are located at the front and rear of the vehicle, and are mounted on the ends of and connected together by a wire-like rod which may be made of elastic steel of relatively small gage, so that alinement of the axes of the arrows is not necessary and consequently no particular care need be taken in the installation of the device to secure any accuracy of alinement. The arrow-carrying shaft is mounted at the ends in journal brackets so arranged as to be readily secured to the vehicle and may also be arranged to support lamps by means of which the arrows are illuminated at night. The arrow-carrying shaft is provided at a point convenient to the operator with a gravity structure, whereby the shaft may be rocked in one direction or the other, or may be allowed to rest in a normally neutral position. The gravity structure is so made that the arrows are automatically returned to the neutral position when displaced therefrom and the gravity device is so arranged as to be readily moved by the foot of the operator to the indicating positions, the direction of movement of the foot of the operator conforming to the desired direction-indicating position of the arrows.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1 is a plan view of the chassis of an automobile with the direction signal of the present invention applied and moved to one of the active indicating positions.

Fig. 2 is a front elevation of a portion of an automobile with the indicating devices of the present invention applied, and positioned to indicate a turn in one direction.

Fig. 3 is a rear elevation of the automobile with the invention applied and showing the position assumed by the rear indicator when moved in the same manner as shown in Figs. 1 and 2.

Fig. 4 is a perspective view of the indicator structure by itself but as it would appear when assembled upon an automobile.

Fig. 5 is a horizontal section of the rear portion of the indicator in the position shown in Fig. 3.

Fig. 6 is a horizontal section of the front portion of the indicator as seen in Fig. 2.

Fig. 7 is a front to rear upright section of the intermediate operating mechanism of the indicator.

Fig. 8 is an elevation with some parts in section of the structure shown in Fig. 7.

Referring to the drawings there is shown the chassis 1 of an automobile, and as the showing of the chassis is only for illustrative purposes, and such chassis in its structure has nothing to do with the present invention, no description thereof is needful and parts will only be referred to as may be found necessary in locating the indicating device.

The indicator structure of the present invention is best shown in Fig. 4 to which reference is particularly directed, but features of the invention are shown in all the different figures of the drawing.

The operator's compartment of an automobile is provided with a flooring indicated at 2 in Figs. 1, 7 and 8. Applied to the upper surface of the floor 2 is a plate 3 of suitable shape having an elongated slot or passage 4 therethrough which when the plate is properly located on the floor 2 to which it may be held by screws 5, extends transversely of the length of the vehicle. Attached to the under surface of the floor 2 is an angle bracket 6, the means of attachment comprising screws or bolts 7 traversing the plate 3 and the flooring 2 and tapped into the bracket 6. Of course, it will be understood that any suitable means of securing the parts described to the flooring 2 may be employed, whether the securing means be such as described or be of other form.

The bracket 6 has a depending web which near the lower end is provided with a suitable passage for a bolt 8, said bolt having at one end a head 9 and at the other end an exteriorly threaded extremity 10 receiving a nut 11. The bolt 8 has an axial passage 12 therethrough for a purpose to be described. Mounted on the bolt 8 between the bracket 6 and the nut 11 is a gravity member or weight 13 held to the bolt by a set screw 14 tapped through one side of the weight and extending through one side of the bolt 8 to the longitudinal passage 12. The set screw 14 serves to secure the weight 13 to the bolt, and the latter is mounted to turn on its longitudinal axis in the bracket 6. Extending from the weight 13 on the side of the bolt remote from the greater mass of the weight is a finger 15 provided with a passage or hole 16 therethrough traversed by an angle extremity 17 on one end of an upright bar 18 rising through a passage 19 in the floor 2, said passage coinciding with the slot 4 in the plate 3. The bar 18 is of sufficient length to rise an appropriate distance above the plate 3 and is there forked into two opposed branches forming a foot receiving member or rest 20 with the extremities of the forked portion uprising, as shown at 21, to form guards for the foot to prevent side slipping of the foot when applied to the foot rest 20.

If it be assumed that the device so far described is mounted on an automobile the foot rest 20 rises above the floor 2 for a short distance, and is readily accessible to the operator who may place his foot upon the foot rest 20 and then by a pressure applied both downwardly and sidewise may cause a rocking movement of the bar 18 causing the weight 13 and bolt 8 then constituting a fulcrum or journal for the weight to rock on the longitudinal axis of the bolt. Downward pressure upon the foot rest then causes the rocking movement of the weight to continue until the heavy end of the weight is raised to about a horizontal position, its ordinary position being downward or pendent. The rockable weight with the manipulating foot actuated bar 18 constitutes a broken lever, whereby a sidewise movement of the foot rest as it is moved downwardly causes a lifting movement of the pendent end of the weight to the same side of the vertical plane passing through the axis of the bolt as that toward which the foot rest is moved.

Extending through the passage 12 axially of the bolt 8 is a rod or shaft 22 made long enough to extend from one end of the automobile to the other, either in one piece or through the intermediary of connecting devices, in which latter case the manner of actuating the weight may be varied from that shown in the drawings and may follow the construction shown and described in a companion application, Serial No. 875,337, filed by me on December 3, 1914, under the title automobile direction signal.

Considering the shaft 22 as a one-piece shaft, it extends oppositely from the bolt 8 to the corresponding ends of the automobile and at each end carries a block 23, 24, respectively. Each block 23 and 24 is provided with an axial stem 25 and a set screw 26 and is further provided with an axial passage for the reception of the corresponding end of the shaft 22, which shaft is engaged by the set screw 26 to hold the block in place thereon. The block 23 carries an indicator 27 and the block 24 carries an indicator 28. Each of these indicators is preferably in the form of an arrow and may be made of appropriate sheet metal secured to the respective block 23 or 24 in any appropriate manner, as by soldering or brazing, or the block may be appropriately formed to have the arrow otherwise secured to it, so that the block and arrow are effectively in one piece.

At the front of the vehicle there is provided a bracket 29 having angle arms 30 and 31, respectively, the latter terminating in an angle extremity 32, while the arm 30 terminates in an eye 33. The extension 25 of the block 23 is journaled in the angle of the bracket 29 and the arm 30 is of a length and so disposed that the eye 33 may be utilized for the attachment of the bracket to the vehicle frame by one of the front spring bolts 34 thereof. The arm 31 is utilized for supporting by its angle end 32 a suitable lamp 35 which may be so constructed and situated as to illuminate the front arrow 27. At the rear end of the shaft 22 the block 24 has its axial extension 25 journaled in a bracket 36 which in the particular construction shown is provided with an angle arm extension 37 at one end suitably threaded for the reception of nuts 38, so that this threaded extension may be passed through a suitable part 39 of the rear portion of the chassis and the nuts 38 applied on opposite sides of this part 39 clamp the bracket firmly in place. The other end of the bracket 36 has an upturned extremity 40 designed to carry a tail lamp 41 in position to illuminate the arrow 28.

The shaft 22 is made of relatively small gage, flexible, or more or less elastic, wire, and at the rear end is in the particular arrangement shown extended through a passage 42 bored through the part 39. However, the presence of obstructing parts of the machine in the line of the shaft 22 is not at all detrimental, and does not of necessity demand that the obstructing parts be bored or in any manner changed, since the shaft 22 is quite flexible and it is entirely feasible to carry the shaft, by flexing it, around obstructing parts where the deflection is not too great. The shaft may be rotated or rocked to the extent needed without interference from the deflection of the shaft. By the use of the front and rear journal brackets 29 and 36 the front and rear indicating arrows 27 and 28 are properly supported and held in the desired relation to the vehicle. The axes of these two arrows may or may not be in alinement, and they may or may not be in alinement with the axis of the bolt 8, so that it is quite easy to apply the structure of the present invention to an automobile, since there is little occasion for fitting and under some circumstances no fitting at all is required, such fitting oftentimes being avoided because of the employment of the light, small gage flexible shaft in the form of a wire or small rod of material sufficiently elastic to permit the desired degree of bending without set.

The neutral position of the arrows may be such that the head ends of the arrows point either up or down, since it is desirable that the arrows turn upon a horizontal axis or upon horizontal axes. Since it is desirabel that the weight 13 shall normally gravitate to a neutral position, this weight is arranged pendently and is so secured upon the shaft 22 and the arrows are also so secured upon the shaft that in the pendent position of the weight the arrows assume a neutral position which is with the heads pointing directly down.

Now if the operator desires to divert the course of travel to the right or left, he places his foot upon the foot rest 20, which because of its purpose may be termed a pedal, and by applying pressure to this footrest or pedal in a downward direction with a tendency toward the side of the machine conforming to the intended direction of turning, the heads of the arrows are at once swung toward the side of the vehicle, indicating the intended direction of diversion of course. Under these circumstances the weight is moved to approximately horizontal position and the arrows are likewise moved to an approximately horizontal position, thus apprising those toward whom the vehicle is approaching and those following the vehicle that the operator intends to turn in the direction indicated by the arrows. For this purpose it is not necessary for the operator to use his hands at all, while the instant the foot is removed from the pedal 20 the parts automatically return to the central or neutral position. There is no liability of forgetfully leaving the parts in a set position, since the active positions of the parts are only attained by a continuance of pressure exerted by the operator, and as soon as such pressure is relieved the return of the parts becomes entirely automatic, and without attention at all in any manner on the part of the operator.

The head and tail brackets not only serve as journal supports for the corresponding ends of the shaft 22, but also provide a ready means for sustaining illuminating elements for the arrows, so that they become freely visible at night. By making these arrows of some distinctive color, such as red, they also are freely visible by daylight.

By the use of a weight or gravity member for giving to the indicators a normal constraint toward the neutral position, the whole device is rendered very effective and at the same time exceedingly simple both in construction and operation. Moreover, the employment of the gravity member makes the device particularly reliable since there are no parts to break or get out of order and accumulations of dirt or other deleterious matter to which structures carried upon automobiles, and especially exposed structures, are liable, do not interfere with the positive operation of the device. The operator therefore has the constant assurance that the device is in operative condition, and will always respond in the proper manner to impulses purposely imparted to it. Under all conditions of use the gravity device holds the indicators strictly to the general neutral position, and no shocks or jars to which the vehicle may be subjected are likely to cause any operation of the indicators to the active position. Even should such excessive movement occur, it will be but momentary, so that it would not impart to an observer any information which might be taken as an indication of an intended change in course of the automobile.

With the structure of the present invention the indicating devices, the gravity member, and the connections between the gravity member and the indicating devices all rock in the same direction, that is, toward the side of the vehicle corresponding to the intended change in course, while the operating or manipulating means for causing such rocking has a reciprocatory movement so related to the rocking members that the reciprocatory movement is converted into a rocking or rotative movement. For purposes of simplicity the pedal is directly connected to the weight and is so arranged that a tendency of the pedal toward the side corresponding to the intended change of course determines the action of the pedal upon the weight to rock it in the proper direction. The lateral movement of the pedal is valuable in throwing the pedal off center with relation to the axis of rotation of the weight to give the weight an initial impulse in the proper direction, the remainder of the travel of the pedal following as a matter of course.

What is claimed is:—

1. A direction indicator for vehicles comprising a rockable direction indicating means, a rockable member connected thereto and tending at all times to maintain the indicating means in a neutral position, and a reciprocable manipulating member connected to the rockable member for rocking the latter in a direction opposite to the direction of movement of the reciprocating member in causing such rocking movement.

2. A direction indicator for vehicles, comprising rockable direction indicating means, a rockable gravity member connected thereto to maintain the indicating means in neutral position with the gravity member pendent, and a reciprocable member connected to the gravity member for causing rocking movements of said gravity member and indicating means by reciprocating movements of the said reciprocating member.

3. A direction indicator for vehicles comprising an arrow-like indicating member, a gravity member, a shaft connecting the gravity and indicating members together with both members fixed to the shaft, and a reciprocatory actuating member with connections between said reciprocating member and the gravity member for causing the latter to rock from a normally pendent position to an elevated position to carry the indicating member with it to indicating position.

4. A direction indicator for vehicles comprising an arrow-like indicating means, a normally pendent weight, a shaft connecting the weight and indicating means and consisting of a normally straight rod of a gage and character to readily bend and operate with the axes of the indicating means and weight out of alinement, and means for causing rocking movements of the weight, shaft and indicating means to move the latter into operative positions.

5. A direction indicator for vehicles comprising rockable indicators adapted to be placed at the opposite ends of the vehicle, connections between the indicators for causing them to move together to different indicating positions, a normally pendent rockable weight carried by the connections for holding the indicators in a neutral position, and a reciprocatory manipulating member having pivotal connections joined to the connections between the indicators for causing rocking movements of said indicators and weight by reciprocatory movements of the manipulating member.

6. A direction indicator for vehicles comprising indicators adapted to be placed at opposite ends of the vehicles and each movable on a substantially horizontal axis from a normally intermediate neutral position to substantially horizontal positions of direction indication, a connecting rod between the indicators of a gage and character to assume a normally straight position and readily bend to operate with the axes of the indicating means out of alinement, gravity means connected to the rod and having a normal tendency to hold the indicators in the neutral position, and reciprocable means for rocking the rod to carry the indicators to different indicating positions by reciprocatory movements of the manipulating means.

7. A direction indicator for vehicles comprising arrow-like indicating members adapted to move about a substantially horizontal axis from a normal up and down neutral position to horizontal active positions, rod connections between the indicators of flexible material and of a gage to readily conform to out of alinement positions with respect to the axes of the indicators and to operate in such position, a normally pendent weight carried by the rod connections for holding the indicators in the neutral position, and a reciprocatory manipulating member for imparting rocking movements to the rod indicators and weight by reciprocatory movements of the manipulating member.

8. A direction indicator for vehicles comprising a shaft of a length to reach from one end of the vehicle to the other, arrow-like indicators mounted on the ends of the shaft and fast thereto, a normally pendent weight made fast to the shaft at an intermediate point thereof, and means for imparting rocking movements to the weight, shaft and indicators comprising a reciprocable member having one end accessible to an operator and the other end pivotally connected to the weight, and a guide for said reciprocable member for permitting it to follow the rocking movements of the weight to which it is connected.

9. A direction indicator for vehicles, comprising a shaft of a length to extend from one end of the vehicle to the other, journal bearings for the ends of the shaft, arrow like indicators secured to the shaft at the ends thereof, a normally pendent weight fast to the shaft at an intermediate point thereof, a journal bearing for the weight, and means for imparting rocking movements to the weight and through it to the shaft and indicators, comprising a reciprocable pedal member within reach of the operator of the vehicle and provided with a pivotal connection to the weight, and a guiding member whereby said pedal member may be reciprocated and rocked.

10. A direction indicator for vehicles, comprising a rock shaft of a length to extend from one end of the vehicle to the other, indicators fast to the shaft at the ends thereof, journal supports for the ends of the shaft, a normally pendent weight fast to the shaft at an intermediate point thereof, a journal support for the weight permitting rocking movements of said weight, means for securing the journal support of the weight to the vehicle, a reciprocable bar having one end pivoted to the weight and at the other end terminating in a foot-receiving member adapted to be located within reach of an operator, and a guide plate for the reciprocable bar for permitting limited rocking movements thereof in addition to its reciprocatory movements, whereby the bar may be moved laterally with respect to the axis of movement of the weight to determine the direction or rocking movement of said weight.

11. A direction indicating means for vehicles comprising a rock shaft of a length to reach from one end of the vehicle to the other, arrow-like indicators one fast to each end of the rock shaft, brackets at each end of the rock shaft provided with journal bearings therefor and each bracket having means for its attachment to the vehicle, a journal member fast to the rock shaft at an intermediate point thereof, a normally pendent weight fast to the journal member and provided with an extension to that side of the axis of the journal member remote from the body of the weight, a journal support for the intermediate journal member and adapted to be secured to the under side of the floor of that portion of the vehicle occupied by the operator, a laterally slotted plate adapted to be secured to the floor of the vehicle in the compartment occupied by the operator, and a manipulating member comprising a bar extending through the slotted portion of the plate with one end pivotally connected to the extension of the weight, and at the other end expanded to form a foot-receiving member or pedal.

In testimony, that I claim the foregoing as my own, I have hereto affixed my signature in the presence of two witnesses.

EDGAR J. BRYAN.

Witnesses:
C. P. HEBERT,
C. E. CARROLL.